J. Yeager,
Cutting Leather,
Nº 61,132. Patented Jan. 8, 1867.
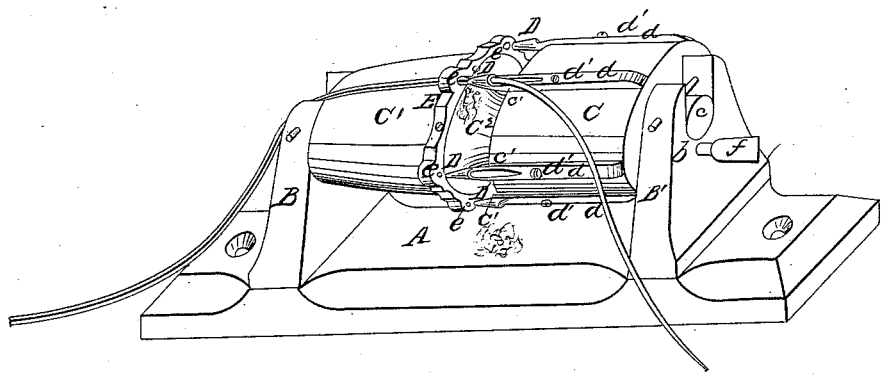
Witnesses:
Chris Jourgensen
Norman B Smith
Inventor:
Josiah Yeager
By his Attorney
Addison M Smith

United States Patent Office.

JOSIAH YEAGER, OF BERRYSBURG, PENNSYLVANIA.

Letters Patent No. 61,132, dated January 8, 1867.

---

IMPROVED MACHINE FOR ROUNDING LEATHER.

---

The Schedule referred to in these Letters Patent and making part of the same.

---

TO ALL WHOM IT MAY CONCERN:

Be it known that I, JOSIAH YEAGER, of Berrysburg, county of Dauphin, and State of Pennsylvania, have invented a new and useful Machine (or Apparatus) for Rounding Strings of Leather for Fly-Net Straps and other purposes; and I do hereby declare the following to be a full, clear, and exact description thereof, reference being had to the accompanying figure of drawing and to the letters of reference thereon, making a part of the same, and in which is represented, in a perspective view, the manner in which my invention may be carried out in a compact and convenient form for use.

My invention consists in the employment of a tubular cutter or cutters, in connection with a guide or guides, by means of which the straps of leather to be rounded are guided and held in proper relation to said cutter; it further consists in mounting a series of cutters, (of different sizes,) upon a drum or cylinder, by the rotation of which the cutter or cutters of the desired size are brought into a proper and convenient working position; and it further consists in providing means for adjusting the cutters on said drum or cylinder for the purpose of bringing them into proper relation to the strap-guides, to cause the straps or strings to be cut evenly and centrally, as hereinafter described.

To enable others to construct and use my invention, I will proceed, with reference to the drawing, to describe how the same may be carried out in practice.

In said drawings, A represents a base or platform, and B B' uprights or standards mounted in said platform, and which are slotted or perforated at or near their tops, to receive and form bearings, $b\ b$, for the journals or shaft of the drum or cylinder C. Said drum is made in the form shown in the drawing, or in any other desired or convenient form, for the purposes required of it, as hereinafter explained, and is provided with the journals $c\ c$, which rest and are free to turn in the bearings $b$, in the uprights or standards. D D are tubular cutters, which may be of various sizes and shapes to adapt them to the work to be performed, that is, to the size and shape of string or strap required. Said cutters are placed longitudinally on the drum, and are secured thereto by means of set-screws $d'$ passing through the shank $d$ of the cutter. One or more of these set-screws may be used for each cutter, and the shanks of the cutters may have slots formed in them lengthwise to admit of their longitudinal adjustment on the drum or cylinder, should such adjustment be found necessary or desirable to compensate for wear or other purposes. Under the cutter end, and between the cutter and the drum or other supporting device, I place a small wedge, $g'$, which adapts the cutter to be adjusted on the drum for the purpose of bringing the cutter, when secured thereto, into proper working relation to its guide, hereinafter described. E is an annular flange or ring surrounding the drum or cylinder, in front of the series of cutters, said ring being passed over the tapering or conical end of the drum indicated in the drawing at $C^1$, and being secured thereto at the desired distance from the cutters by screws or other suitable means for holding thereon. The flange or ring E is perforated, as shown at $e$, at intervals corresponding to the distance the cutters are from each other on the drum or cylinder, and the cutters are secured to said drum in such manner as to bring them directly opposite to or in front of the perforations, which are designed to serve as guides to the strap or string being operated upon or rounded. These guides or perforations are made of different sizes, corresponding to and a little larger than the cutter in connection with which they are to be used. The drum is cut away under the cutter ends and between the cutters and the ring or guides, as shown at $C^2$ in the drawing, and in such manner as to allow the ready escape of the portions of leather cut from the strap or string in rounding the same. $f$ is a pin which passes through a perforation in the standard, into one of a series of holes in the end of the drum, and serves to hold the drum in place after it has been turned or adjusted to bring the cutter of the desired size into convenient working position; any other suitable device, such as a spring catch, may be used for this purpose.

The operation will be readily understood. The drum or cylinder having been so adjusted as to bring the cutter or cutters to be used to the upper face of the cylinder, and into convenient position for operation, the leather to be rounded, having first been cut into strips of suitable size, and having one end tapered or pointed, to admit of its ready insertion, the operator passes the pointed end of the strap or string through the guide and the corresponding cutter, when it is seized by the operator, or by a suitable mechanical device for the purpose, and drawn through the cutter, the guide serving to hold the strap or string in proper relation to the cutter to cause it to be cut evenly and centrally from the strap, and preventing the strap from "kinking," and consequently from being cut out or divided. It will be obvious that modifications may be made in some of the parts without departing from the invention. For example, I have shown the drum, as a means for supporting the cutters, and have thereby effected a compact and convenient arrangement of the cutters and guides; other forms, as a cube or polygonal block, or even a plane surface, may be used. A set-screw may be substituted for the wedge for the purpose of effecting a proper adjustment of the cutter relative to its guide. The form of the cutters may be varied from the cylindrical form shown to a flattened, oval, or other desired form; it may be made tubular for its entire length, or the strap may be allowed, after being rounded, to pass out at one side, operating similarly to the eyelet-hole cutter.

Having now described one good way in which my invention may be carried out in practice, what I claim, and desire to secure by Letters Patent of the United States, is—

The employment of the tubular cutter, arranged and operating substantially as and for the purpose described.

I also claim the arrangement of the guide or perforation in relation to the tubular cutter, substantially as and for the purpose described.

I also claim the employment of a series of cutters and guides, mounted upon the drum C, or its equivalent, substantially as and for the purpose described.

I also claim making the cutter adjustable upon the drum or cylinder, by means of the wedge and set-screw or equivalent devices, substantially as described.

I also claim the drum or cylinder, mounted in the uprights or standards in such manner as to be free to turn in bearings therein, in combination with a means for setting or holding the said drum together with the cutters in any desired or convenient working position, substantially as described.

JOSIAH YEAGER.

Witnesses:
   J. D. SNYDER,
   E. H. SALLDA.